(12) United States Patent
McCarthy et al.

(10) Patent No.: US 7,661,375 B2
(45) Date of Patent: Feb. 16, 2010

(54) SECURE ENCLOSURE AND DOOR

(75) Inventors: Craig McCarthy, San Diego, CA (US);
Stanley Dunaway, Oceanside, CA (US);
Leonard A. Dunaway, legal representative, Overland Park, KS (US);
G. Bradford Saunders, San Diego, CA (US)

(73) Assignee: Holocom, Inc., Carlsbad, CA (US)

( * ) Notice: Subject to any disclaimer, the term of this patent is extended or adjusted under 35 U.S.C. 154(b) by 413 days.

(21) Appl. No.: 11/709,892

(22) Filed: Feb. 23, 2007

(65) Prior Publication Data

US 2008/0314298 A1 Dec. 25, 2008

Related U.S. Application Data

(63) Continuation-in-part of application No. 11/043,017, filed on Jan. 24, 2005, now Pat. No. 7,183,488, which is a continuation-in-part of application No. 10/690,272, filed on Oct. 21, 2003, now Pat. No. 7,053,303.

(51) Int. Cl.
*E06B 3/36* (2006.01)
(52) U.S. Cl. .................... 109/74; 109/59 R; 109/64
(58) Field of Classification Search ............... 109/59 R, 109/64, 74
See application file for complete search history.

(56) References Cited

U.S. PATENT DOCUMENTS

| 406,848 | A | * | 7/1889 | Mosler ..................... 109/70 |
| 459,226 | A | * | 9/1891 | Hollar ..................... 109/74 |
| 553,348 | A | * | 1/1896 | Mannstaedt ................. 109/74 |
| 1,464,213 | A | * | 8/1923 | Mosler et al. ............... 109/74 |
| 1,749,222 | A | * | 3/1930 | Merriam .................... 109/74 |
| 2,387,172 | A | * | 10/1945 | Mosler et al. ............. 109/74 |
| 2,681,018 | A | * | 6/1954 | McClellan ................. 109/74 |
| 3,808,984 | A | * | 5/1974 | Teleky .................... 109/59 R |
| 3,842,761 | A | * | 10/1974 | Bloom .................... 109/59 R |
| 4,145,978 | A | * | 3/1979 | Johnson et al. ........... 109/59 R |
| 4,532,870 | A | * | 8/1985 | Hayman .................... 109/58 |
| 4,704,970 | A | * | 11/1987 | Sanderson et al. ........... 109/73 |
| 4,741,277 | A | * | 5/1988 | Salzer .................... 109/77 |
| 5,209,168 | A | * | 5/1993 | Chapron et al. ........... 109/591 |
| 5,479,341 | A | | 12/1995 | Lawrence et al. |
| 5,544,595 | A | * | 8/1996 | Stephenson et al. ........ 109/74 |
| 5,831,211 | A | | 11/1998 | Gartung et al. |
| 5,931,104 | A | * | 8/1999 | Horn et al. .............. 109/59 R |

(Continued)

FOREIGN PATENT DOCUMENTS

DE 8514800 U1 9/1985

OTHER PUBLICATIONS

International Search Report for PCT/US02/09592 issued Aug. 7, 2002.

(Continued)

*Primary Examiner*—Suzanne D Barrett
(74) *Attorney, Agent, or Firm*—Procopio, Cory, Hargreaves & Savitch LLP

(57) ABSTRACT

A door for a secured enclosure includes a door panel and a generally L-shaped flange extending along one edge of the panel. The L-shaped flange is adapted to engage a corresponding flange of the enclosure, whereby the L-shaped flange and the corresponding flange overlap. The structure prevents access to the secured enclosure between the flanges.

15 Claims, 4 Drawing Sheets

U.S. PATENT DOCUMENTS

| | | | |
|---|---|---|---|
| 5,971,515 A * | 10/1999 | Baker et al. | 312/329 |
| 6,257,154 B1 * | 7/2001 | Kasper | 109/73 |
| 6,838,616 B2 * | 1/2005 | Harrison et al. | 174/50 |
| 6,971,322 B2 * | 12/2005 | DuBois et al. | 109/24.1 |
| 7,049,517 B2 | 5/2006 | McCarthy et al. | |
| 7,053,303 B2 | 5/2006 | McCarthy et al. | |
| 7,115,814 B2 | 10/2006 | McCarthy et al. | |
| 7,183,488 B2 | 2/2007 | McCarthy et al. | |
| 7,404,363 B2 * | 7/2008 | Dunstan | 109/70 |

OTHER PUBLICATIONS

Translation of Claim 1 of German Reference DE8514800, Osten-Sacken, Eberhard V. Der.

* cited by examiner

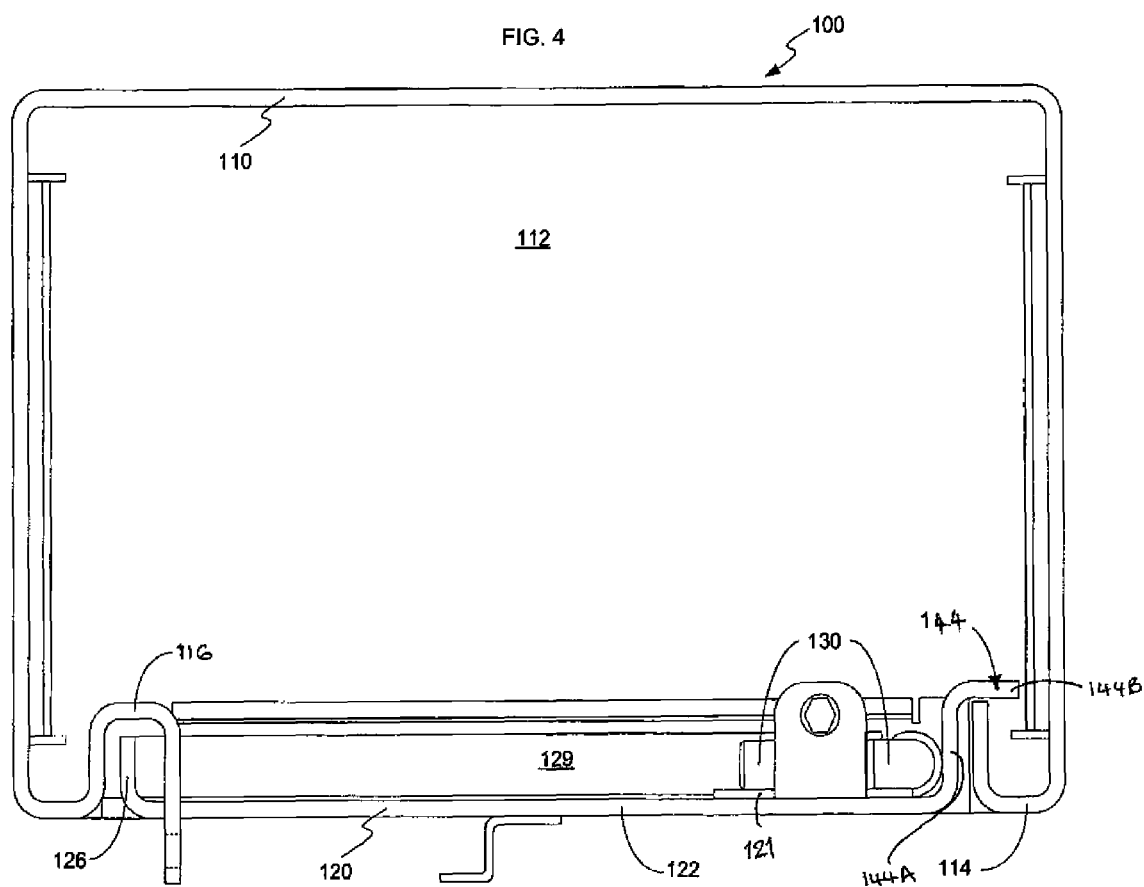

SECURE ENCLOSURE AND DOOR

CROSS-REFERENCE TO RELATED APPLICATIONS

This application is a continuation-in-part of currently U.S. patent application Ser. No. 11/043,017, filed Jan. 24, 2005, now U.S. Pat. No. 7,183,488 which is a continuation-in-part of U.S. patent application Ser. No. 10/690,272, filed Oct. 21, 2003, now U.S. Pat. No. 7,053,303, the subject matter of each of which is herein incorporated by reference.

FIELD OF THE INVENTION

This disclosure relates to secure enclosures that offer enhanced resistance to physical intrusion and particularly that offer a more secure door.

BACKGROUND OF THE INVENTION

Secure enclosures are used in many applications. The most common examples of such enclosures are safes for protecting valuables, guns, etc. and electrical panel enclosures typically used for secure networks such as may be found in military and other governmental applications. The weakest element in any such secure enclosure has historically been the door, which must allow easy access within the enclosure when required and prevent such access otherwise, by definition, two completely opposite goals. Thus, an ongoing need exists for offering more intrusion-proof doors for secure enclosures. The embodiments of the present disclosure answer these and other needs.

Of interest is U.S. Pat. No. 6,838,616 which is directed to an enclosure which is highly secure, permits access to a cabled network system only by one user at a time, permits visual and unequivocal observation of the security status of the enclosure, and prevents access to the interior thereof only by authorized persons. Within the enclosure is a system connection device to the system, which is configured for access thereto by only a single user at a time. The patent is specifically directed to cabled systems, such as cabled communication and computer networks and a more general secure enclose would be beneficial in a number of areas. U.S. Pat. No. 6,838,616 is hereby incorporated by reference.

SUMMARY OF THE INVENTION

In a first embodiment disclosed herein, a door for a secured enclosure includes a door panel and a generally L-shaped flange extending along one edge of the panel, the L-shaped flange being adapted to engage a corresponding flange of the enclosure, whereby the L-shaped flange and the corresponding flange overlap, thereby preventing access to the secured enclosure between the flanges.

In another embodiment disclosed herein, an enclosure includes a structure enclosing a space and formed with a door opening to receive a door therein, at least one hinge disposed along a first edge of the door opening, and a door comprised of a door panel and a generally L-shaped flange extending along one edge of the panel at a preselected angle to the panel, the door pivoting around the at least one hinge to be received in the door opening with the L-shaped flange disposed along the first edge so that the at least one hinge is enclosed within the structure when the door is closed.

In a further embodiment disclosed herein, a method of forming an enclosure includes selecting a structure formed to enclose a space and including a door opening to receive a door therein, disposing at least one hinge along a first edge of the door opening, selecting a door comprised of a door panel and a generally L-shaped flange extending along one edge of the panel at a preselected angle to the panel, and disposing the door to pivot around the at least one hinge so as to be received in the door opening with the L-shaped flange disposed along the first edge such that the at least one hinge is enclosed within the structure when the door is closed.

In still further embodiments, the door may further include a substantially planar flange extending along an edge of the L-shaped flange to form a substantially U-shaped channel in cooperation therewith, and the structure may further include a substantially planar flange extending along the first edge into the interior of the structure so as to lie substantially within the U-shaped channel when the door is closed. The structure may also include a substantially planar flange extending along the first edge into the interior of the structure so as to lie generally parallel to a portion of the L-shaped flange when the door is closed. The door may also include a substantially planar flange extending along another edge of the panel.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 4 is a horizontal cross-sectional view of a modified enclosure similar to the enclosure of FIGS. 1 to 3 but with a modified door flange.

DETAILED DESCRIPTION OF EXEMPLARY EMBODIMENTS

A typical target for attacking an enclosure are the hinges of the door. Thus, one goal of the present disclosure is to provide a secure enclosure that disposes the hinge mechanism for its door wholly within the enclosure and that offers enhanced intrusion resistance around the hinge area of the door.

Figure 1:
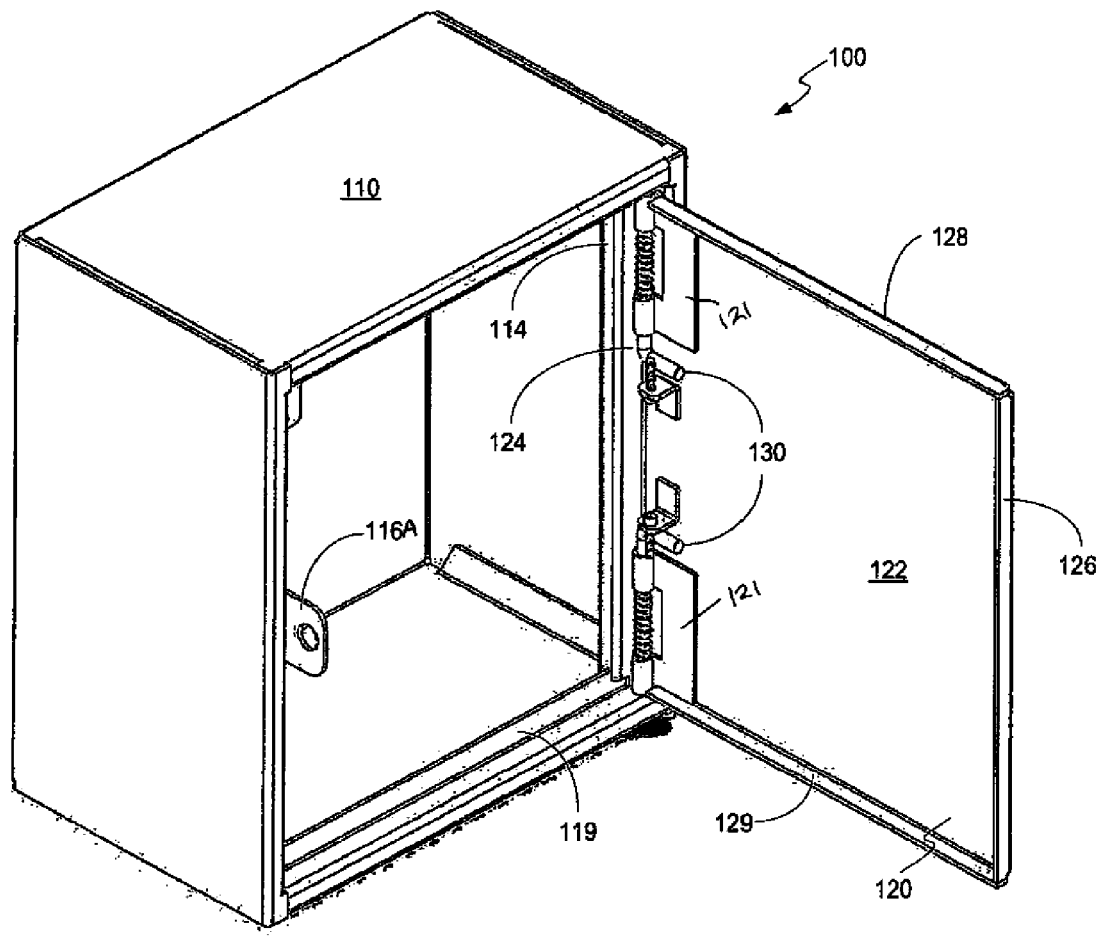
FIG. 1 is a perspective view of an enclosure in accordance with an embodiment of the present invention.
Figure 2:
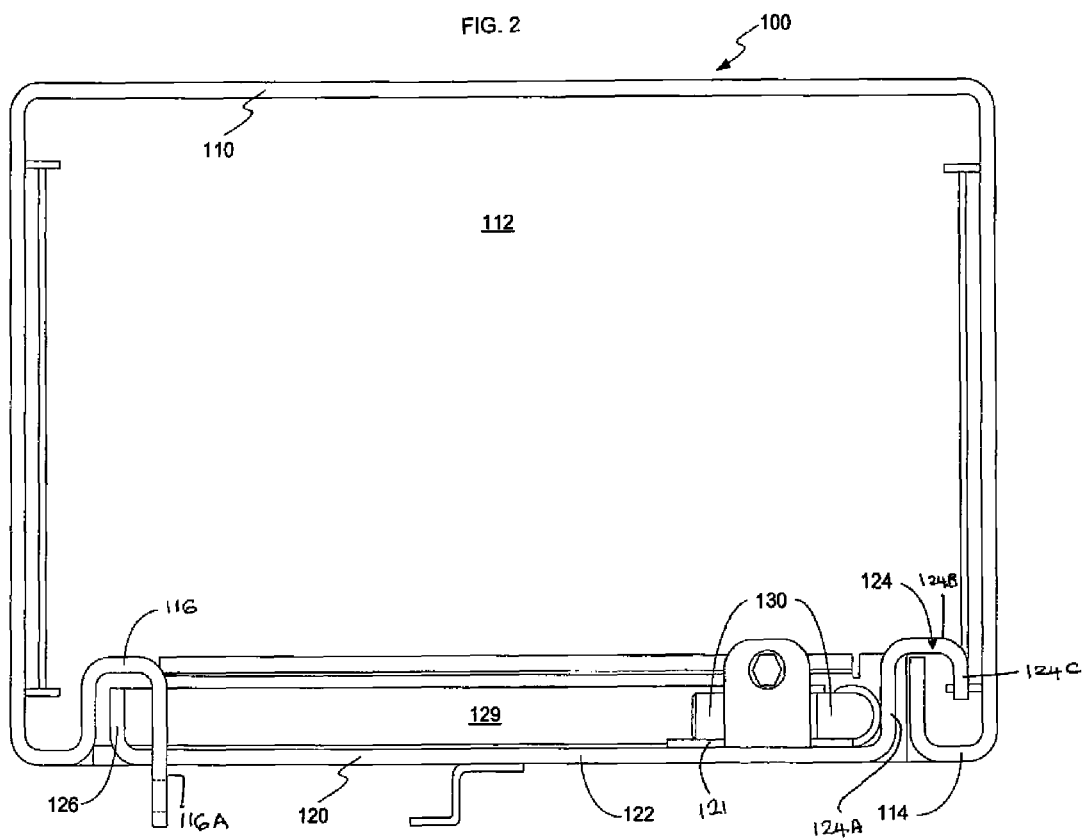
FIG. 2 is a horizontal cross-sectional view of the enclosure illustrated in FIG. 1, with the door closed.

Referring specifically to FIGS. 1 and 2, one embodiment of an enclosure 100 according to the present disclosure includes a structure or housing 110 for enclosing a space or volume 112 in which the objects to be protected can be stored, and a door 120 received in a door opening in the structure. The structure is shown for discussion purposes as having generally rectangular proportions, but the present invention contemplates any practicable design for the present structure, such as a rectangular shape or the like.

Similarly, the door 120 is shown as having a typical, generally flat configuration with a planar panel 122 having an inner face and an outer face, but any configuration for the door is contemplated by the present invention. The door 120 may include a flange 124 that extends along one edge of the door panel 122 and into the interior of the enclosure structure 110, as seen in FIG. 2. The flange 124 forms a generally U-shaped channel having a first portion 124A extending inwardly from the edge of the planar panel 122, a second portion 124B extending away from first portion 124A towards the adjacent edge of the enclosure, and a third portion 124C extending from the outer edge of portion 124B towards the outside of the enclosure, as indicated in FIG. 2. A reciprocal flange 114 extends along the respective edge of the enclosure 100 to form another generally U-shaped channel along the edge of the enclosure 100, and that receives the door flange 124 so that the two generally U-shaped channels cooperate with one another to receive each into the other with minimal space therebetween.

Thus, the U-shaped channel of the door flange 124 is open to the outside of the enclosure whereas the U-shaped channel of the enclosure structure 110, is open to the inside of the enclosure. As will be appreciated, this disposition is dictated by the need for the door to swing open towards the outside of the enclosure, as illustrated in FIG. 3.

Figure 3:
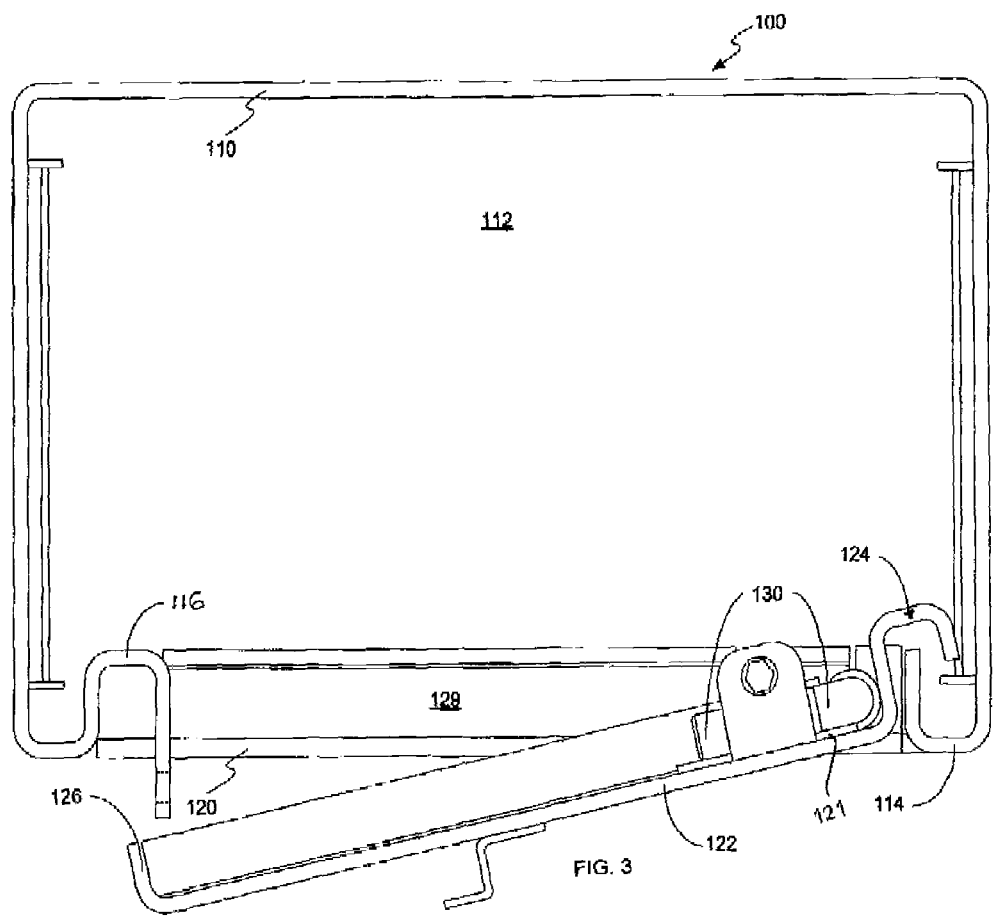
FIG. 3 is a horizontal cross-sectional view of the enclosure of FIG. 1 and FIG. 2 with the door open.

As seen in FIGS. 2 and 3, respective portions of U-shaped channels of the flanges 114 and 124 overlap one another, thereby providing a barrier to prevent intrusion into the structure enclosure 100 between the door 120 and structure 110. As will be appreciated, the bottom of the U-shaped channel provided by the door flange 124 prevents physical intrusion into the interior of the enclosure 100, and the interlocking disposition of the door flange 124 with the enclosure flange 114 further acts to minimize the space between the door 120 and the enclosure structure 110 through which such physical intrusion could be initiated. The door 120 is pivotally mounted in the door opening via hinges comprising hinge plates or devices 121 mounted on the inner face 122 of the door panel adjacent flanges 124 and hinge pins 130 which engage the hinge plates as illustrated in FIG. 1. Hinges 121, 130 are disposed within the enclosure and aligned along the door flange 124 so as to lie outside the U-shaped channel of the door flange 124 to prevent access to the hinges 130 from the outside.

In another embodiment as shown in FIG. 4, the door 120 may be provided with a generally L-shaped flange 144 that has a first portion 144A extending inwardly from the edge of the planar panel 122 and a second portion 144B which extends from the inner edge of portion 144A and away from the door panel, but terminates at the outer edge of portion 144B, eliminating the third flange portion of FIGS. 2 and 3 to form an L-shape rather than a U-shape. Flange 144 acts just like door flange 124 in cooperating with enclosure flange 114 to prevent or limit intrusion into the enclosure. The generally L-shaped door flange 144 is likely less complicated to manufacture, whereas the U-shaped flange 124 may possible offer better protection against intrusion by such fluid means as gas or liquid (e.g. liquid nitrogen) due to the more tortuous flow path that such fluid would have to follow to gain access into the interior of the enclosure.

The enclosure structure may further be formed with another flange 116 disposed along the edge opposite to the hinge edge flange 114 and designed to engage the door 120, as illustrated in FIG. 2. For purposes of illustration, the door is shown as including a flange 126 disposed along the edge opposite the hinge edge and received into an outward-facing U-shaped channel provided by the enclosure flange 116. The enclosure flange 116 thus cooperates with the flange (or lip) 126 of the door in a similar manner to the hinge-edge flanges 114 and 124 to prevent intrusion into the interior of the enclosure by overlapping one another and essentially blocking off the access that might be afforded by the minimal space exists between the door and the enclosure even when the door is closed. As illustrated in FIGS. 1 and 2, an extension 116A of the free end of U-shaped flange 116 may extend through a slot in the door 12 and have an opening for receiving a padlock or the like.

As seen in FIG. 1, the door may include opposite flanges or lips 128 and 129 along the other edges of the door panel 122 which may cooperate with reciprocal flanges of the housing, such as flange 119, to further impede physical intrusion along those edges of the door.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

Applicant has made this disclosure with respect to the current state of the art, but also contemplates advancements and that adaptations in the future may take into consideration of those advancements, namely in accordance with the then current state of the art. It is intended that the scope of the invention be defined by the claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ".

What is claimed is:

1. A door for a secured enclosure, comprising:
    a door panel having an outer face, an inner face, and opposite first and second edges, and configured for mounting in a door opening of an enclosure with the inner face facing inwardly in a first direction into the enclosure;
    a first flange extending along the first edge of the panel, the first flange having at least a first portion extending inwardly in the first direction and a second portion extending outwardly away from the panel at an angle to the first portion to form a general L-shape, the first flange being adapted to engage a corresponding flange of the enclosure, whereby the first flange and the corresponding flange of the enclosure overlap when the door is in a closed position, thereby preventing access to the secured enclosure between the flanges; and
    a hinge device on the inner face of the door panel which is adapted for hinged engagement with a corresponding hinge device on the enclosure, the hinge device being adjacent the first flange, whereby the hinge lies adjacent the inner face of the door and outside the overlapping portions of the first flange and the flange of the enclosure when the door is in the closed position.

2. The door of claim 1, further comprising:
a substantially planar third flange portion extending along an edge of the second portion of the first flange to form a substantially U-shaped channel.

3. A door for an enclosure, comprising:
a door panel having an outer face and an inner face, the inner face adapted to face inwardly in a first direction into an enclosure when the door panel is in a closed position in an opening of the enclosure, and opposite first and second edges;
a first flange extending along the first edge of the door panel, the first flange having at least a first portion extending inwardly at an angle to the panel in the first direction and a second portion extending outwardly away from the panel and towards the first edge of the door opening when the door panel is in a closed position, the first and second portions of the first flange forming a general L-shape, the first flange being adapted to overlap a corresponding flange of the enclosure when the door is in a closed position; and
a substantially planar second flange extending along another edge of the panel.

4. An enclosure, comprising:
a housing enclosing a space and formed with a door opening to receive a door therein;
at least one hinge extending adjacent a first edge of the door opening; and
a door comprised of a door panel moveable between a closed position covering the door opening and an open position allowing access to the enclosed space through the door opening, the door panel having an outer face and an inner face, a hinge engaging device on the inner face of the panel adjacent a first edge of the door panel and in hinged engagement with the hinge at the first edge of the door opening; and
at least a first flange extending along the first edge of the panel outside the hinge engaging device and at a preselected angle to the panel, the first flange having at least a first portion extending inwardly away from the outer face of the panel and a second portion extending away from the panel and towards the first edge of the door opening at an angle to the first portion to form a generally L-shape;
the door pivoting around the at least one hinge to be received in the door opening with the first flange disposed along the first edge so that the at least one hinge is enclosed within the housing when the door is closed.

5. The enclosure of claim 4, wherein the first flange further comprises a substantially planar third flange portion extending along an edge of the second flange portion to form a substantially U-shaped channel.

6. The enclosure of claim 5, wherein the housing further comprises:
a substantially planar flange extending along the first edge of the door opening into the interior of the enclosed space so as to lie substantially within the U-shaped channel when the door is closed.

7. The enclosure of
claim 6, herein the substantially planar flange extends generally parallel to a the first portion of the first flange when the door is closed.

8. The enclosure of claim 4, wherein the door further comprises:
a substantially planar second flange extending along another edge of the panel.

9. An enclosure, comprising:
a housing including an opening providing access to an interior of said housing, and a first flange defining a portion of an outer perimeter of said opening;
a door received in said opening, said door being moveable between open and closed positions with respect to said opening, said door including a panel with a second flange at an outer edge thereof engageable with said first flange, such that a portion of said first flange overlaps a portion of said second flange and provides a barrier between the interior and exterior of the housing in the closed position while allowing said door to rotate between open and closed positions;
said first flange forming a U-shape facing inwardly into the interior of said housing and having an inner leg adjacent the second flange;
said second flange having at least a first flange portion extending inwardly and generally parallel to the inner leg of the U-shaped first flange in the closed position, and a second flange portion at an inner end of the first flange portion extending at an angle to the first flange portion and over an inner end of said inner leg in the closed position; and
a pivot connection between an inner face of said door and the outer perimeter of said opening which is outside said U-shaped first flange and in the interior of said housing when the door is in the closed position.

10. The enclosure according to claim 9, wherein the opening is generally rectangular and has opposite first and second edges and opposite third and fourth edges extending around the entire outer perimeter of said opening, and the door panel is of generally rectangular shape substantially matching the shape of said opening and has opposite first and second outer edges adjacent the first and second edges, respectively, of said opening, and opposite third and fourth outer edges adjacent the third and fourth edges, respectively, of said opening, said first flange continuously extending along the first edge of said opening for substantially the entire first edge; and
said second flange continuously extending along the entire first outer edge of said panel for substantially the entire first outer edge.

11. The enclosure according to claim 9, wherein
at least one of said first and second flanges is substantially L-shaped.

12. The enclosure according to claim 9, wherein
said first and second flanges form substantially U-shaped channels, respectively, and
said U-shaped channels interlock wit one another.

13. The enclosure according to claim 9, wherein
said housing includes a third flange opposite said first flange; and
said door panel includes a fourth flange opposite said second flange, a portion of said third flange overlapping a portion of said fourth flange providing a barrier between the interior and exterior of said housing.

14. The enclosure according to claim 9, wherein
said door panel including at least one hinge adjacent said second flange such that the hinge is received entirely within said housing when said door is in the closed position.

15. An enclosure comprising:
a housing enclosing an interior space and having a door opening providing access to the interior space, the door opening having opposite first and second edges, a first flange extending along the first edge of the opening to form an inwardly facing, first generally U-shaped channel and a second flange extending along the second edge of the opening to form a second generally U-shaped channel;

a door received in said door opening and pivotally coupled to the housing for movement between open and closed positions with respect to said opening, the door comprising a panel having opposite third and fourth edges which are adjacent the first and second edges of said door opening in the closed position; and the door panel having a third flange extending along the third edge and a fourth flange extending along the fourth edge, the third and fourth flange each having a portion which overlaps a portion of the first and second flange, respectively, in the closed position of the door panel to provide a barrier between the interior and exterior of said housing.

* * * * *